Patented July 23, 1929.

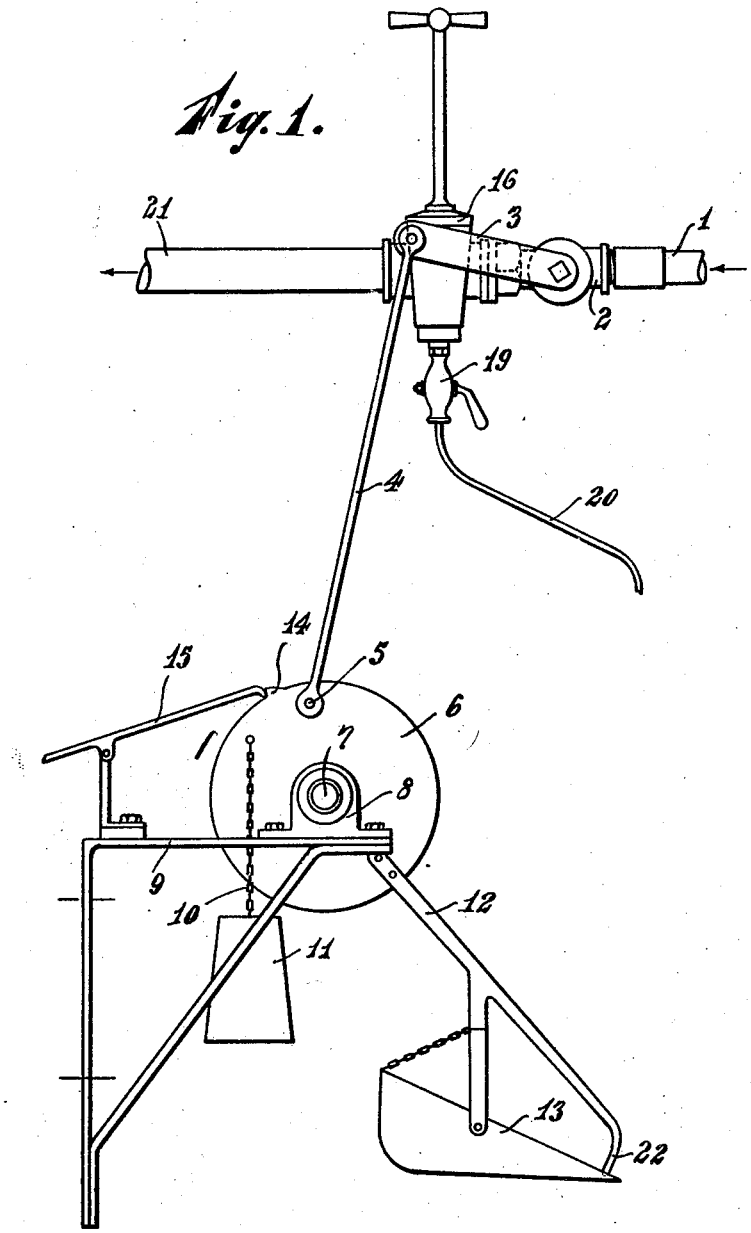

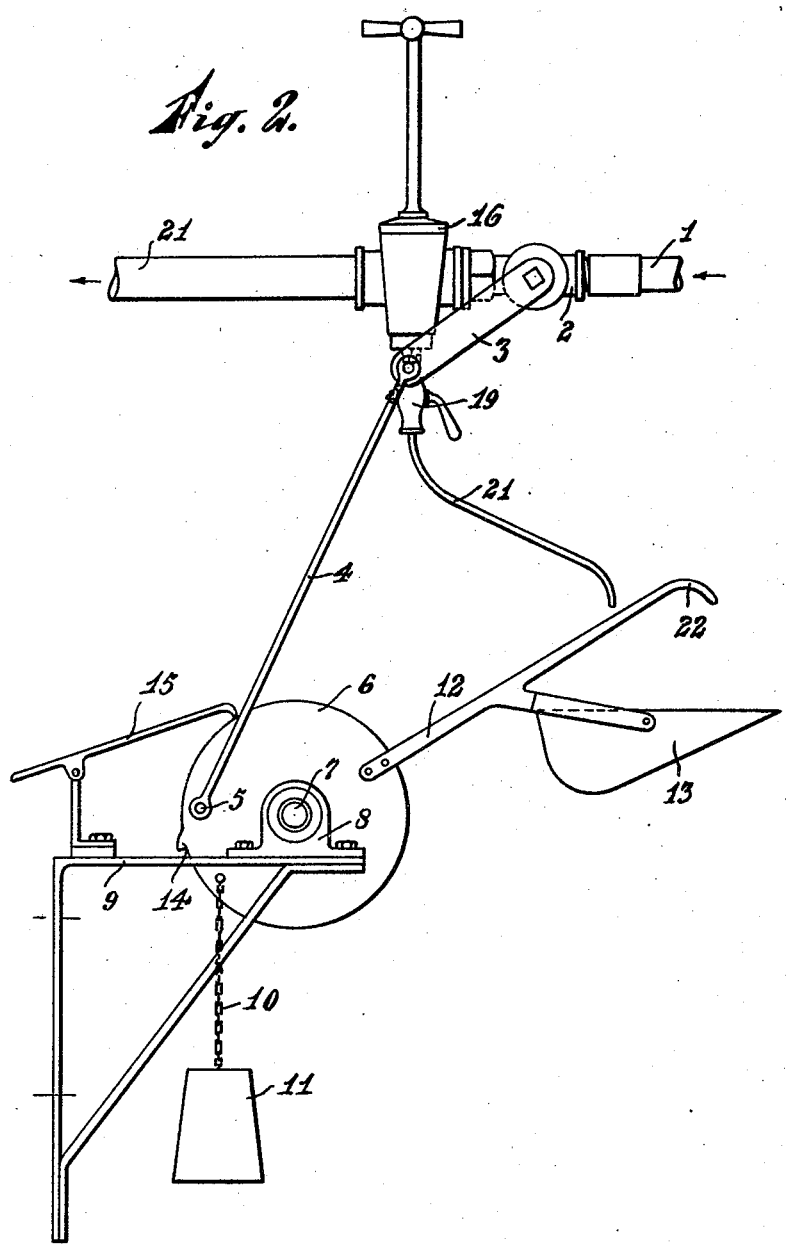

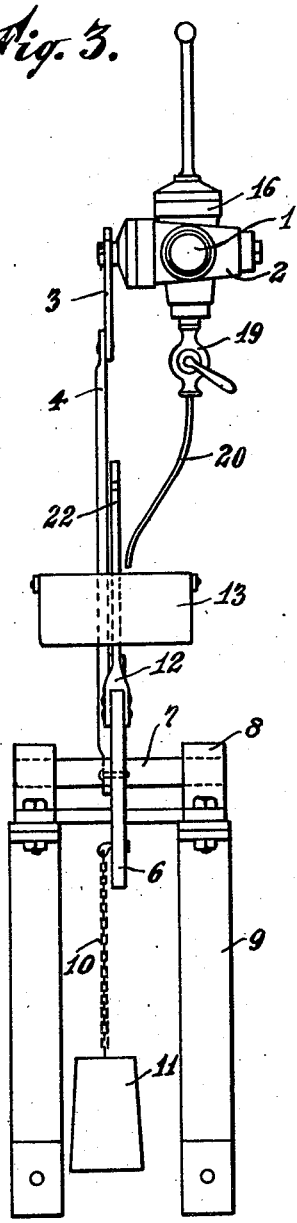
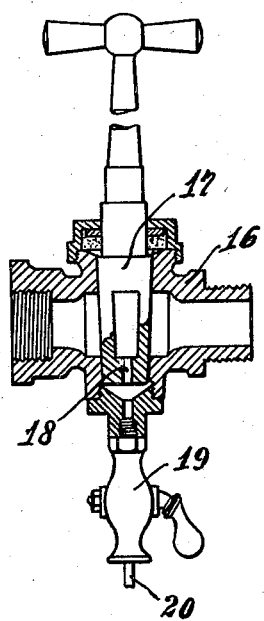

1,722,185

UNITED STATES PATENT OFFICE.

JAN van KLEEF, OF SOERABAJA, JAVA, DUTCH EAST INDIES.

PREPAYMENT WATER METER.

Application filed March 17, 1927, Serial No. 176,155, and in the Netherlands March 29, 1926.

The invention relates to a prepayment liquid or watermeter and has for its object to obtain a very simple and nevertheless reliable construction, whereby the manufacturing costs become low, so that a more general application is possible.

The invention consists generally in this, that in the waterconduit a cock or corresponding closing member is arranged and a driving rod and crank or similar mechanism is provided, whereby the cock may be opened and closed, which mechanism for the direction of rotation "open cock" is influenced by a weight or a spring of predetermined size or tension and for the direction of rotation "close cock" by a weight of a variable size, increasing according as more water flows through the conduit.

According to the invention a crank disc with horizontal shaft may be used. From this crankdisc a weight is suspended in such a manner, that it causes the disc to rotate and to open the cock as soon as a pawl preventing this rotation is lifted by the thrown in coin, while to the disc a lever with container is secured, which, when the cock is opened, is filled through a branch-conduit from the main conduit, finally overcomes the action of the weight, rotates the crankdisc back and closes the cock.

The container may according to the invention be movably connected to the lever in such a manner, that the end of the lever causes the container to assume in its lowermost position, an inclination at which it is entirely emptied.

The invention and its different features may be more fully understood by reference to the following description of one good form thereof shown in the accompanying drawings, wherein:

Fig. 1 is a side elevation at the closed position of the main cock.

Fig. 2 is a side elevation at the open position of the main cock.

Fig. 3 is a front elevation at the open position of the main cock.

Fig. 4 is a section of a detail.

In the main conduit 1 a cock 2 is arranged. For moving the plug, the square end is provided with a lever 3 which by means of a rod 4 is connected to a pin 5 of a crank disc 6. This crank disc has a horizontal shaft 7, that is freely rotatable in the bearings 8 which are supported by the supports 9. From the crank disc 6 a weight 11 is suspended by means of a chain 10. Further a lever 12 is secured to the crank disc, from the end of which lever a container 13 is suspended in a manner to be described hereinafter.

The crank disc 6 is further provided at its circumference with a cam 14 adapted to cooperate with a pawl 15.

In the main conduit behind the cock 2 a second cock 16 is arranged. The plug 17 of this cock is bored at the lower side (see Fig. 4) and the passage 18 is connected with a regulating cock 19. This cock 19 is connected with a conduit 20. In order to explain the operation of the meter it is first referred to Fig. 1. In the position shown of the mechanism the cock 2 is closed and the cocks 16 and 19 are opened. Water cannot flow through the conduit.

If a coin is thrown into the slot (not shown) then it falls on the end of the pawl 15. This pawl is thereby lifted and the weight 11 causes the crank disc 6 to rotate in anticlockwise direction, whereby the cock 2 is opened, water flows through the conduit 1 and may be delivered at 21. The mechanism now occupies the position shown in Fig. 2. Owing to the fact that the water flows through the conduit 1, a small quantity, dependent on the position of the cock 19, will flow through the conduit 20 and fill the container 13. Now, this container is so dimensioned, that at a predetermined position of the water therein it can overcome the negative moment of the weight 11 on the shaft of the crank disc 6 and cause this disc to rotate in clockwise direction, whereby the cock 2 is closed. By adjusting the cock 19, the time in which the container 13 is filled entirely, and thereby the time during which the cock 2 remains opened, may be regulated, in other words the quantity of water which is delivered for the coin thrown in.

When the mechanism returns in the initial position the container 13 must have been or must be emptied. This is obtained by the manner in which the container is suspended from the lever 12 and which appears sufficiently from the drawing. The end 22 of the lever 12 presses, when moving downwardly upon the bottom of the container and causes the latter to occupy an inclined position, whereby it may be entirely emptied.

The pawl 15 in the meantime has fallen again behind the cam 14 of the disc 6 and the mechanism is ready for the throwing in of a fresh coin.

If the mechanism is brought into the position shown in Fig. 2 and the water flows through the conduit, the consumer may, if desired, close the cock 16. The mechanism will now retain its position but no water is flowing any more through the conduit. Within the limits determined by the coin thrown in, one can consequently, by cock 16, take from the conduit any desired quantity of water.

With regard to watermeters in which containers are filled the contents of which is to be received at any time by the consumer, the one according to the invention has the advantage, that water is directly taken from the closed conduit. Thus the water cannot be infected by or in the meter, which constitutes an important advantage, in particular in the tropics.

It will be understood that the invention is not limited to the specific embodiment shown, and that various deviations may be made therefrom without departing from the spirit and scope of the appended claims.

What I claim is:

1. A water meter comprising a water conduit, a valve member in said conduit, a shaft having a crank disc mounted thereon, a connecting rod connecting said valve and said crank disc, a weight suspended from said crank disc and adapted to rotate said disc in a direction for opening said valve, means for preventing said weight from rotating said disc, a container fixed to said disc and adapted to rotate said disc in opposite direction to the rotation effected by said weight, and a by-pass conduit in said water conduit adapted to gradually fill said container when the valve is open.

2. A water meter according to claim 1 in which the container adapted to be filled from the by-pass conduit is movably connected to said disc, whereby upon movement of the container to a predetermined lower position it assumes an angular position at which it is entirely emptied.

3. An apparatus for delivering liquid in a predetermined quantity, comprising a supply conduit, a valve in said conduit, means for opening and closing said valve, means in said conduit for by-passing a portion of the liquid passing through said valve, a container for receiving said by-passed liquid, and means connecting said container with said valve closing means to close said valve when a predetermined amount of said by-passed liquid is deposited in said container.

4. A water meter comprising a water conduit, a valve in said conduit, opening and closing mechanism operatively connected to said valve, means acting on said mechanism for opening said valve, a container operatively connected to said mechanism, a by-pass conduit in said conduit adapted to gradually fill said container when the valve is open, said by-pass conduit being connected to said main conduit by means of a regulating valve.

5. A liquid meter comprising a supply conduit, a valve in said conduit, opening and closing mechanism operatively connected to said valve, means acting on said mechanism for opening said valve, a container operatively connected to said mechanism, a by-pass conduit in said conduit adapted to gradually fill said container when the valve is open, and a second valve member in the supply conduit disposed between the first valve and a by-pass conduit.

In testimony whereof I affix my signature.

JAN van KLEEF.